(12) United States Patent
Sharma

(10) Patent No.: US 11,582,092 B2
(45) Date of Patent: *Feb. 14, 2023

(54) ROUTING CONFIGURATION

(71) Applicant: Comcast Cable Communications, LLC, Philadelphia, PA (US)

(72) Inventor: Alankar Sharma, Mt. Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,734

(22) Filed: Jan. 6, 2022

(65) Prior Publication Data
US 2022/0210011 A1  Jun. 30, 2022

Related U.S. Application Data

(63) Continuation of application No. 16/176,230, filed on Oct. 31, 2018, now Pat. No. 11,252,026.

(60) Provisional application No. 62/579,433, filed on Oct. 31, 2017.

(51) Int. Cl.
*H04L 41/0806* (2022.01)
*H04L 45/02* (2022.01)

(52) U.S. Cl.
CPC .......... *H04L 41/0806* (2013.01); *H04L 45/02* (2013.01); *H04L 45/04* (2013.01)

(58) Field of Classification Search
CPC ...... H04L 41/0806; H04L 45/02; H04L 45/04
See application file for complete search history.

(56) References Cited

U.S. PATENT DOCUMENTS

| | | |
|---|---|---|
| 2008/0259817 A1 | 10/2008 | Jeansonne et al. |
| 2014/0105029 A1* | 4/2014 | Jain .......................... H04L 43/10 370/242 |
| 2018/0183656 A1* | 6/2018 | Jones .................... H04W 24/04 |
| 2020/0059450 A1 | 2/2020 | Fitzgerald et al. |
| 2022/0021622 A1* | 1/2022 | Sharma ............... H04L 43/0876 |

* cited by examiner

*Primary Examiner* — James E Springer
*Assistant Examiner* — Patrick F Ngankam
(74) *Attorney, Agent, or Firm* — Banner & Witcoff, Ltd.

(57) ABSTRACT

Systems, apparatuses, and methods may provide for robust and autonomous provisioning of routing nodes and/or server stacks within a network. For instance, each routing node and/or server stack may perform self-discovery (e.g., determines its own identity and where it has been placed in the network), and determine its role (e.g., how to route packets) within the network.

25 Claims, 8 Drawing Sheets

| Subtype bits | Routing TLV Type | Description |
|---|---|---|
| 1000 0000 | UNK | Indicates originator's level is unknown or undefined |
| 1000 0001 | LEVEL | Data field of this TLV contains the current calculated level of originator |
| 1000 0010 | REQ | Request to neighboring node to send its level |
| 1000 0011 | AUTH LEVEL | Contains originator's authoritative level (not calculated) |
| 1000 0100 | RST | Instructs neighboring node to reset its level to undefined and start over |
| 1000 0101 | REBUILD | Instructs neighboring node to resets its level to undefined, start over, send REBUILD to neighboring nodes |
| 1000 1111 | VERSION | Identifies version number and schema used |

ROUTING CONFIGURATION

RELATED APPLICATIONS

This application is a continuation of U.S. patent application Ser. No. 16/176,230, filed on Oct. 31, 2018, which claims priority to U.S. Provisional Application No. 62/579,433 filed Oct. 31, 2017. The entire disclosures of these applications are hereby incorporated herein by reference.

BACKGROUND

Service providers have multiple data centers with each data center including numerous routing nodes and server stacks. When a new data center is established or when new routing nodes and/or server stacks are connected within a data center, the routing nodes and/or server stacks may need to be provisioned to provide services and/or otherwise operate within the network.

Routing nodes and/or server stacks are typically provisioned manually using external input from a human operator. For instance, to provision a routing node and/or server stack, the human operator logs into the routing node and/or server stack via a command line interface and informs, via the command line interface, the routing node and/or server stack of its identity and its role (e.g., how to route packets) in the network. Due to the vast number of routing nodes and server stacks in the network, such a manual provisioning process is very time and resource consuming as well as prone to errors. Accordingly, there remains an ever-present need to accurately and quickly provision routing nodes and server stacks within a network.

SUMMARY

The following presents a simplified summary in order to provide a basic understanding of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Systems, apparatuses, and methods may provide for routing protocols for particular computing device topologies (e.g., a fat tree network topology, a "clos" network topology, etc.). The protocol, in one example, may allow any device (e.g., routing nodes, server stacks, etc.) within a network topology to identify itself. By facilitating self-discovery, the protocol allows these devices to autonomously provision themselves using their self-discovered identities without communicating with provisioning devices. As a result, these devices may autonomously establish their own routing rules with respect to other devices in the network topology.

One example of a network topology may be a hierarchical network topology. In such a hierarchical topology, the network may include multiple levels (e.g., layers) of devices (e.g., routing nodes and server stacks) with one or more (e.g., all) of the devices having not yet been provisioned. In such an example, devices within a top-most level may be informed, via external input, of its identity and configured to periodically send, on each of its ports/links, messages that include an indication of a level (e.g., placement within the hierarchical topology) of a device that is sending the message.

After a device receives a message, the device may wait a configurable preset minimum time period prior to the device determining its own level. By waiting the present minimum time period, the device may account for delay in various network paths. As will be explained in further detail below, a device may determine its own level within the hierarchical network topology and, after its level has been determined, may periodically send, on each of its ports/links, messages that include an indication of the determined level. As a result, a device may receive messages from multiple devices. During the time period, the device may monitor its ports and collect any additional messages received from other devices. After the preset minimum time period has elapsed, the device may extract, from the message that caused the time period to begin and each message received during the time period, the indication of the level of the device sending the message.

Under this example, the messages are not forwarded to other devices by devices receiving such messages. Instead, the messages are consumed by the device receiving the messages. As a result, a device should only receive the messages from devices within its same level or from its immediately adjacent levels (e.g., one level immediately above the device or one level immediately below the device). Each of the devices may be pre-configured and/or may receive identity-determination rules for determining its own level within the hierarchical topology. These identity-determination rules may account for the fact that the messages may be consumed (and not forwarded). Based on the identity-determination rules and the indications of one or more levels of the devices sending the messages, the device that received the messages may determine its own level within the hierarchical network topology.

As noted above, after a device determines its own level within the hierarchical network topology, the device may begin periodically sending, on each of its ports/links, messages that include an indication of its determined level within the hierarchal network topology. As a result, the process of other devices receiving such messages, waiting the configurable preset minimum time period, determining their own levels, and periodically sending their own messages may be iteratively repeated. Thus, each of the devices within each of the levels of the hierarchical network topology may eventually identify its own level within the topology. After a device has determined its own level within the hierarchical network topology, the device may, based on its determined level, provision itself using a provisioning protocol, such as, for example, routing in fat trees (RIFT) protocol.

Accordingly, these devices are able to autonomously determine their identities and use that information to automatically provision themselves.

These features in the summary above are merely examples of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

FIG. 5 depicts an example of a table of types that may be included in a message.

DETAILED DESCRIPTION

In the following description of various example features, reference is made to the accompanying drawings identified above, which form a part hereof, and in which is shown by way of illustration examples in which features of the disclosure may be practiced. Other features may be utilized and structural and functional modifications may be made, without departing from the scope discussed herein. Various features are capable of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
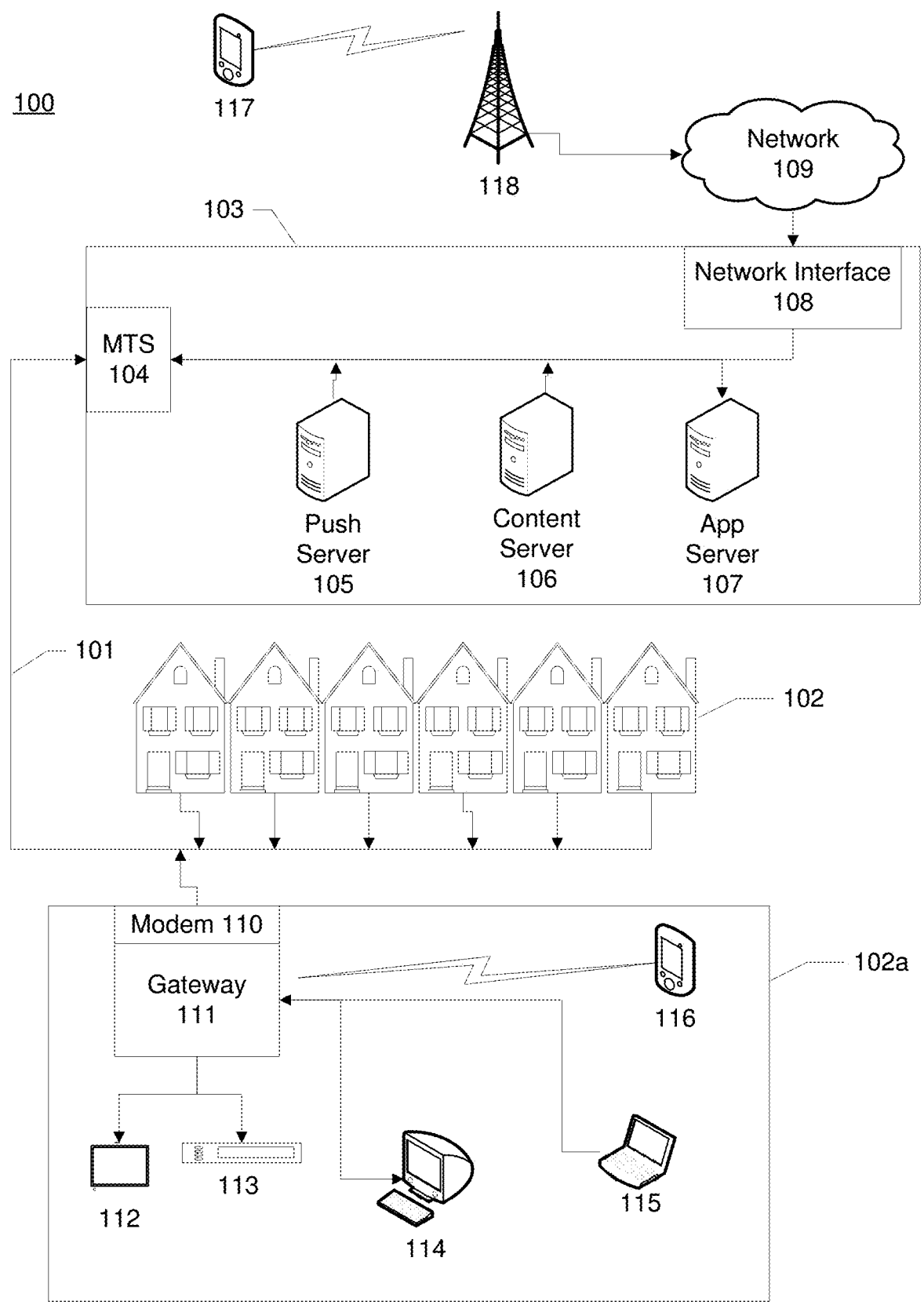
FIG. 1 depicts an example information access and distribution network.

FIG. 1 illustrates an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend). The local office 103 may send or cause the transmission of downstream information signals onto the communication links 101, and each of the premises 102 may have a receiver used to receive and process those signals.

One of the communication links 101 may originate from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly. Portions of the communication links 101 may also be implemented with fiber-optic cable, while other portions may be implemented with coaxial cable, other lines, or wireless communication paths. The communication links 101 may be coupled to a base station 118 configured to provide wireless communication channels to communicate with mobile device 117. The wireless communication channels may be Wi-Fi IEEE 802.11 channels, cellular channels (e.g., LTE), and/or satellite channels.

The local office 103 may include an interface 104, such as a termination system (TS). As an example, the interface 104 may be a cable modem termination system (CMTS), which may be a computing device configured to manage communications between devices on the network of the communication links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding mobile devices 117 (e.g., cell phones, smartphone, tablets with cellular radios, laptops communicatively coupled to cellular radios, etc.).

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being sent to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102a, such as a home, may include an interface. The interface may include any communication circuitry needed to allow a device to communicate on one or more of the links 101 with other devices in the network. For example, the interface may include a modem 110, which may include transmitters and receivers used to communicate on the links 101 and with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface. Further, the interface may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones (e.g. Voice over Internet Protocol—VoIP phones), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
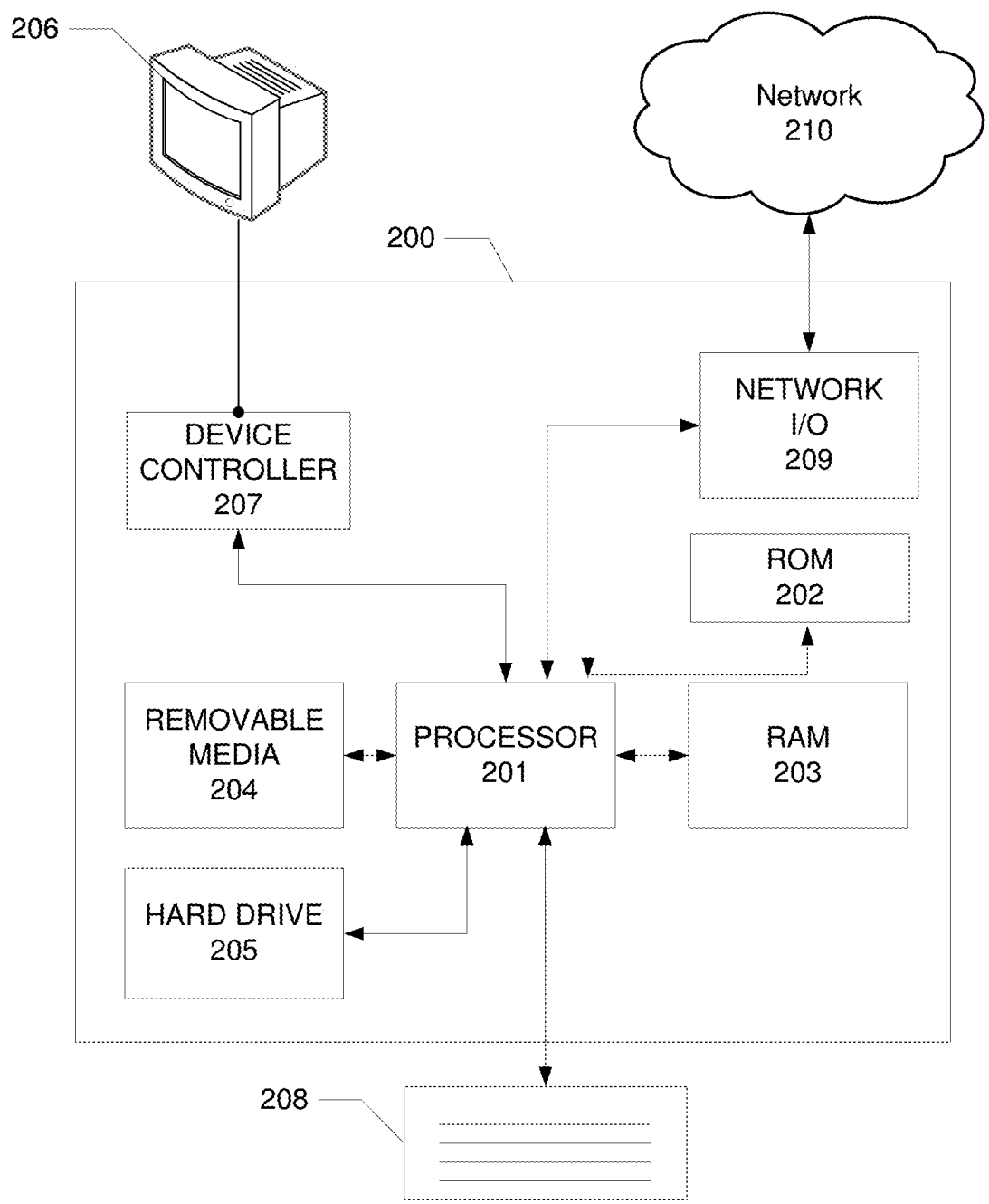
FIG. 2 depicts an example computing device that may be used to implement any of the features and devices described herein.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some cases, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor (not shown), which may be configured to receive and process global positioning signals and determine, with possible assistance from an external server and antenna, a geographic position of the computing device 200.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more features described herein may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Figure 3:
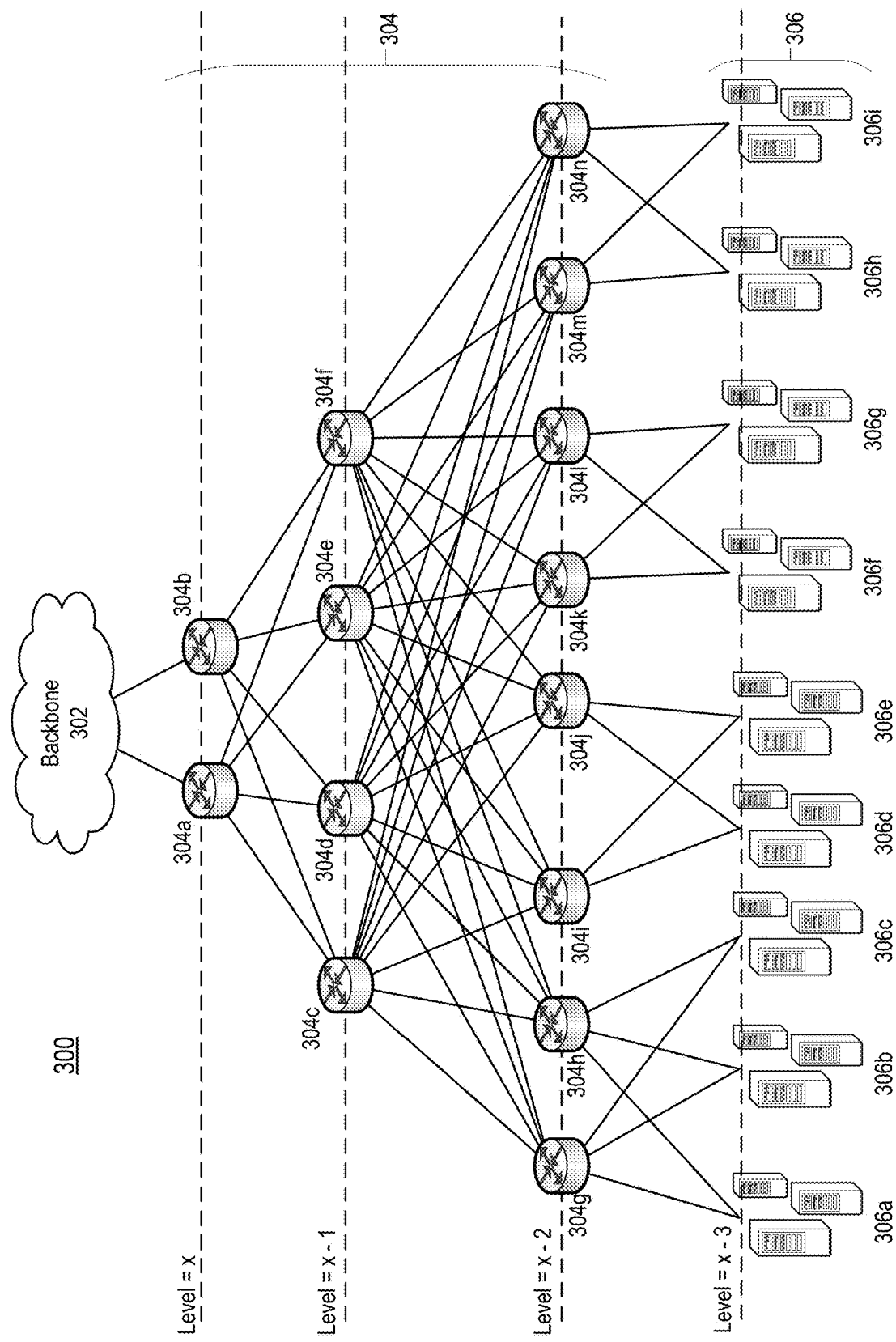
FIG. 3 depicts an example network topology.

A service provider (e.g., the local office 103) have multiple data centers to aid the service provider in providing various services. Each of the service provider's data centers may include a hierarchical network. FIG. 3 depicts an example hierarchical network 300 of one of the service provider's data centers. The hierarchical network 300 may include a network backbone 302, which connects to one or more other networks such as the Internet or other networks (e.g., other hierarchical networks of different data centers of the service provider) via transport links and may be responsible for allowing the hierarchical network 300 to exchange information with them.

The hierarchical network 300 may also include numerous routing nodes 304 and server stacks 306. Once provisioned, the routing nodes 304 may be responsible for routing communications between the network backbone 302, other routing nodes 304, and server stacks 306. Each of the routing nodes 304 may be a computing device, such as, for example, a router and include one or more components of the computing device 200. Once provisioned, the server stacks 306 may be responsible for providing services (e.g., application services, streaming services, content services, etc.) of the service provider to other devices. The services may be provided via the routing nodes 304 and the network backbone 302. Additionally, the server stacks 306 may be responsible for storing resources of the service provider including, for example, content items (e.g., movies, games, music, etc.), applications, and other resources. A server stack 306 may be one or more of servers 105-107 and include one or more components of computing device 200.

Each of the routing nodes 304 and server stacks 306 may be physically connected, via wired cabling links, to one or more other routing nodes 304 and/or one or more other server stacks 306 to generate the hierarchical network 300 topology. Each of the routing nodes 304 and/or server stacks 306 may include multiple communications ports which may be connected to the wired cabling links. As an example, a routing node (e.g., routing node 304g) may include a port connected to a wired cabling link and the wired cabling link may also be connected to a port of another routing node (e.g., routing node 304c) thereby creating a physical communication path between the routing node and the other routing node. A routing node (e.g., routing node 304g) may include another port connected to another wired cabling link and this wired cabling may also be connected to a port of a server stack (e.g., server stack 306a) thereby creating a physical communication path between the routing node and the server stack. A link layer protocol such as Link Layer Discovery Protocol (LLDP) may allow routing nodes 304 and server stacks 306 to send link layer messages, via the ports and wired cabling links, to one another prior to being provisioned. In some cases, prior to provisioning of a routing node 304 and/or a server stack 306, the routing node 304 and/or the server stack 306 may be limited to communicating via a link layer protocol. For example, the routing node 304 and/or the server stack 306 might not be able to communicate via internet protocol (IP) since it might not yet have an IP address or a media access control (MAC) address, which may be assigned during the provisioning process.

Due to the physical connections of the wired cabling links, the routing nodes 304 and the server stacks 306 may be arranged to establish a hierarchical topology having multiple levels (e.g., layers) with each routing node 304 and server stack 306 being only connected to routing nodes 304 and/or server stacks 306 that are at most one level away in the hierarchy. If a routing node 304 or server stack 306 is connected to a routing node 304 or server stack 306 that is more than one level away, then a cabling error has occurred. The top-most level (e.g., level x in FIG. 3) may include one or more routing nodes 304 (e.g., routing nodes 304a-b) that are each connect to the network backbone 302. Such routing nodes 304 may be known as equalizer gates. A subsequent level (e.g., level x−1 in FIG. 3) may include one or more routing nodes 304 (e.g., routing nodes 304c-f) that are each connected to each routing node 304 of the top-most level (e.g., routing nodes 304a-b) and to each routing node 304 of an immediately subsequent level (e.g., routing nodes 304g-n). A next subsequent level (e.g., level x−2) may include one or more routing nodes 304 (e.g., routing nodes 304g-n) that are connected to each routing node (e.g., routing nodes 304c-f) of the immediately preceding level above (e.g., level x−1). While FIG. 3 shows three levels having only routing nodes 304, there may be any number of levels having only routing nodes. Additionally, routing nodes (e.g., routing nodes 304c-f) within a same level may also be connected to one another via wired cabling links.

A penultimate level (e.g., level x−2) may be the second-to-last level in the hierarchical topology. The last level or bottom-most level (e.g., x−3 in FIG. 3) may include one or more server stacks 306 (e.g., server stacks 306a-i). The last level might not include any routing nodes 304. Further, a bottom-most level that may include a routing node 304 may be the penultimate level in the hierarchical topology.

Unlike the connections between two immediately adjacent levels including routing nodes 304 where each routing node 304 of one level is connected to each level routing node 304 of the immediately adjacent level, a routing node 304 in the penultimate level may be connected to a subset (e.g., less than all) of the server stacks 306 in the bottom-most level. As an example, the routing node 304g may be connected to the server stacks 306a-c but might not be connected to the server stacks 306d-i. Stated similarly, the server stacks 306 may be connected to only a subset (e.g., less than all) of the routing nodes 304 in the penultimate level.

In one example, the network 300 may be a spine and leaf tree network, which aggregates limbs of the tree as a message moves from the bottom-most level to the top-most level. For instance, the number of routing nodes 304 may be reduced in each layer moving from the bottom-most level and towards the top-most level. The leaves of the tree may be the server stacks 306. A spine layer of the tree may be level x−2. An aggregate spine layer may be level x−1.

When a hierarchical network is generated or after a new device (e.g., a routing node 304, a server stack 306) is connected to an existing hierarchical network (e.g., hierarchical network 300), that device has not yet been provisioned and, thus, may only communicate via a link layer protocol. The device might not be able to communicate via an IP protocol or other communication protocols until the device is provisioned. Thus, the devices may wish to become provisioned so that the device may communicate using other communication protocols.

Because the devices (e.g., routing nodes 304, server stacks 306) may communicate via a link layer protocol, after the devices are connected, the devices use their ability to communicate with one another over link layer to autonomously provision themselves. As an example, the devices may communicate via LLDP through the use of custom LLDP types.

Figure 4:
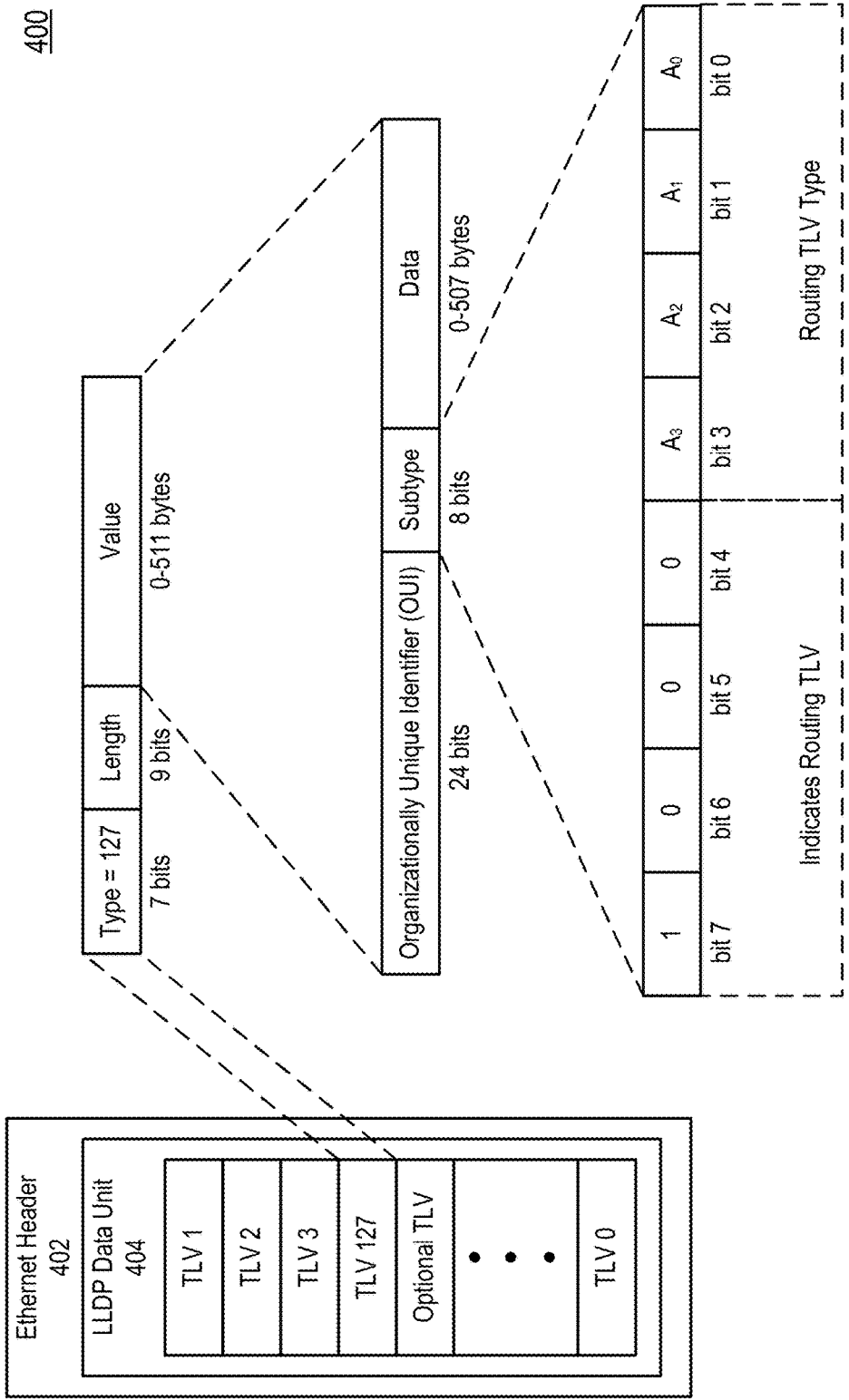
FIG. 4 depicts an example message.

In LLDP, messages are sent as LLDP data units encapsulated in an Ethernet frame. FIG. 4 depicts an example of a message 400, which may include an Ethernet header 402 that encapsulates an LLDP data unit 404. The LLDP data unit 404 may include multiple type-length-value (TLV) containers. Each TLV container may include 3 fields: a "Type" field that may have 7 bits and may have a value from 0 through 127, a "Length" field having 9 bits, and a "Value" field having up to 512 bytes.

In LLDP, some of the containers (e.g., TLV 1, TLV2, TLV3, and TLV 0) may be included in every LLDP data unit (e.g., they may be mandatory). A device (e.g., a routing node 304 or a server stack 306) in the hierarchical network 300 may identify the device from which it receives an LLDP message since TLV 1 may include this information. Additionally, the device may also determine on which port of the sending device sent the received LLDP message since TLV 2 may include a port identifier. Other containers may be optionally included in an LLDP data unit. Yet other containers (e.g., TLV 9 to TLV 126) may not be in use in LLDP as they are reserved.

LLDP allows for a custom use container (e.g., TLV 127), which has a value of 127 for the Type field, a Length of 9 bits, and a Value of 0 to 511 bytes. By modifying and further defining the Value field, an autonomous-provisioning protocol may be implemented. For example, the Value field may be further divided into three additional fields: an organizationally unique identifier field ("OUT") field to identify a particular entity and has a length of 24 bits, a "Subtype" field having a length of 8 bits, and "Data" field having 0 to 507 bytes. Using these additional fields, information useful for allowing a devices to determine its identity and provision itself may be sent between devices of a hierarchical network.

As noted above, the "Subtype" field has 8 bits that define a schema. The most significant four bits (e.g., bit 7 to bit 4) may identify and/or otherwise flag the LLDP message as being a part of the autonomous-provisioning protocol. For example, bit 7, the most significant bit, may include a value of 1, which may be followed by three 0s to indicate the message includes autonomous-provisioning protocol information. The least significant four bits (e.g., bits 3 to 0) may indicate what type of information is being sent in the "Data" field and/or identify an instruction. As a result, the "Subtype" field may have a value ranging from 10000000 to 10001111 (or in decimal from 128 to 143).

FIG. 5 depicts an example of a table of types that may be included in a message and indicated via the "Subtype" field. For instance, subtype bits 10000000 may indicate a routing TLV type of "UNK," which indicates that the sender of the message does not know its level within the hierarchical network. Subtype bits 10000001 may indicate a routing TLV type of "LEVEL," which indicates that the data field of this TLV contains the level of the sender of the message where the level was calculated by the sender of the message. Subtype bits 10000010 may indicate a routing TLV type of "REQ," which indicates a request by a neighboring device for the receiving device to sends its level within the hierarchical network. As used herein a "neighboring" device indicates a directly connected device via a wired cabling link. Subtype bits 10000011 may indicate a routing TLV type of "AUTH LEVEL," which indicates that the data field of this TLV contains the level of the sender of the message where the level was assigned via external input. Subtype bits 10000100 may indicate a routing TLV type of "RST," which indicates that the device receiving the message is to reset its level to unknown. Subtype bits 10000101 may indicate a routing TLV type of "REBUILD," which indicates that the receiving device is to reset its level to unknown and send messages having the "REBUILD" type to neighboring devices connected on its links. Subtype bits 10001111 may indicate a routing TLV type of "VERSION," which indicates that the data field of this TLV contains the version identifier or a schema identifier.

A link layer message may include multiple TLV 127 containers in the LLDP data unit 404, which allows for multiple routing TLV types to be specified in the same message. For example, a link layer message may specify a level of the device sending the message, a version number, and a request for the node receiving the message to send its level within the hierarchical network.

Figure 6:
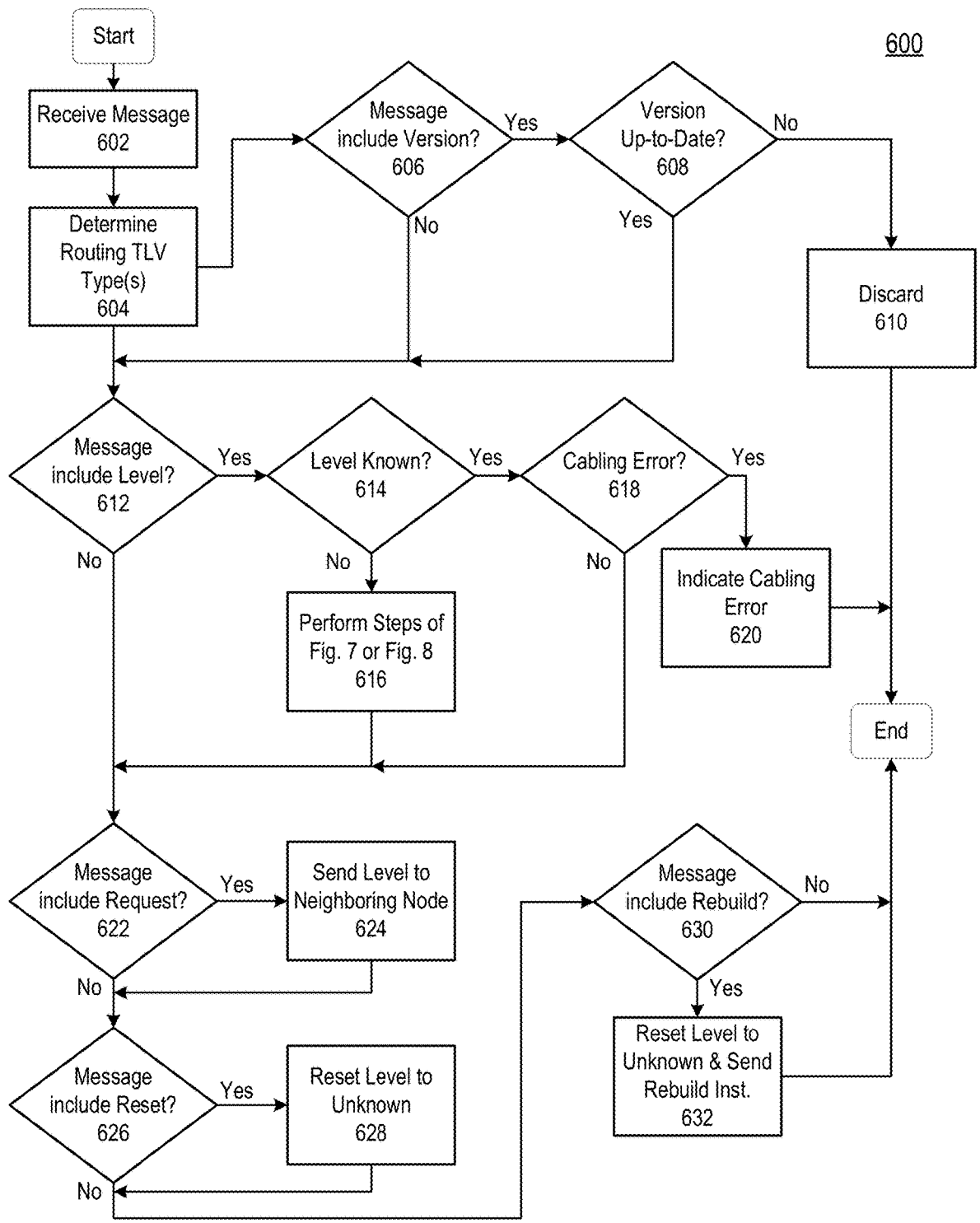
FIG. 6 depicts an example flow chart for consuming a link layer message.
Figure 7:
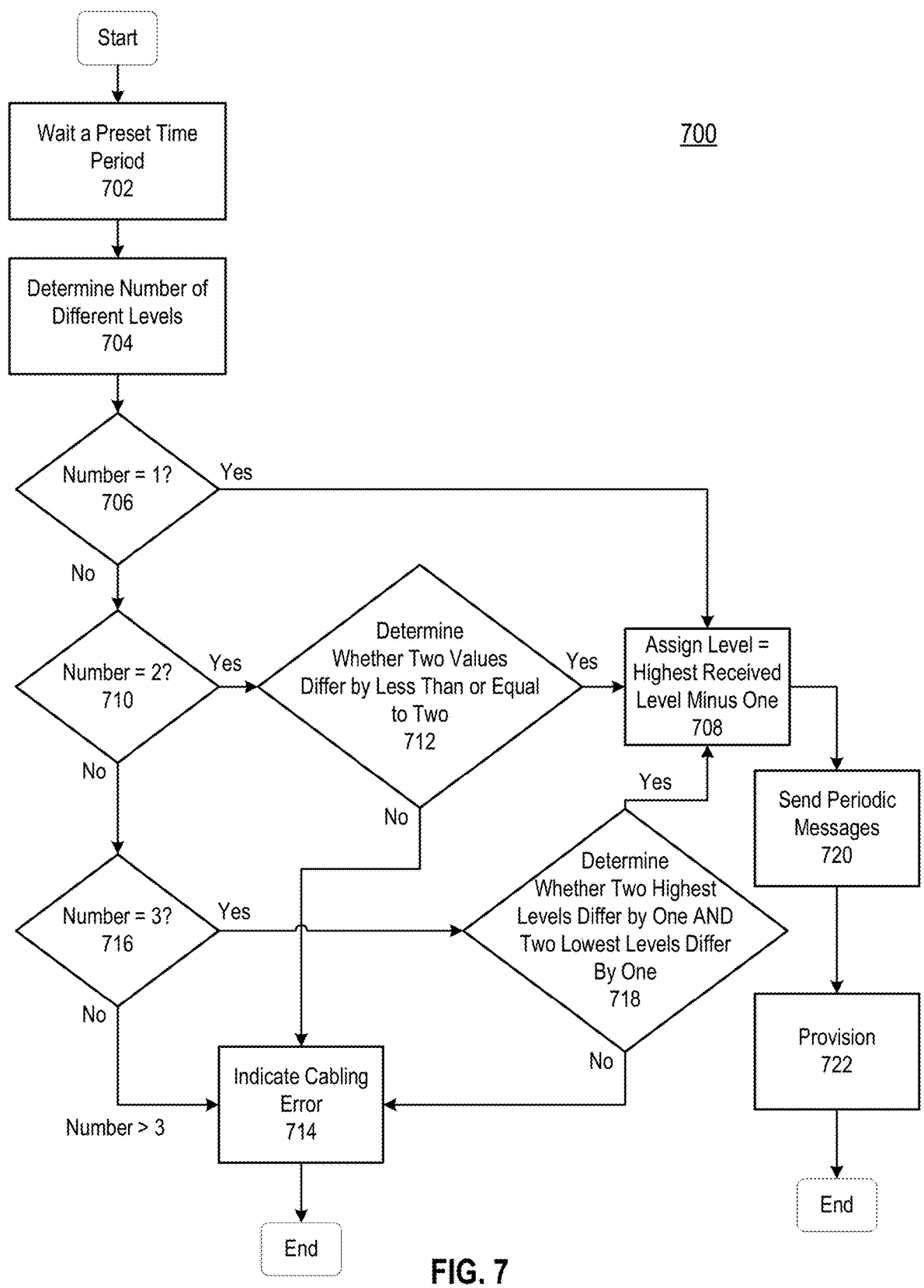
FIG. 7 depicts an example flowchart for determining a level of a device within a network topology and provisioning the device.
Figure 8:
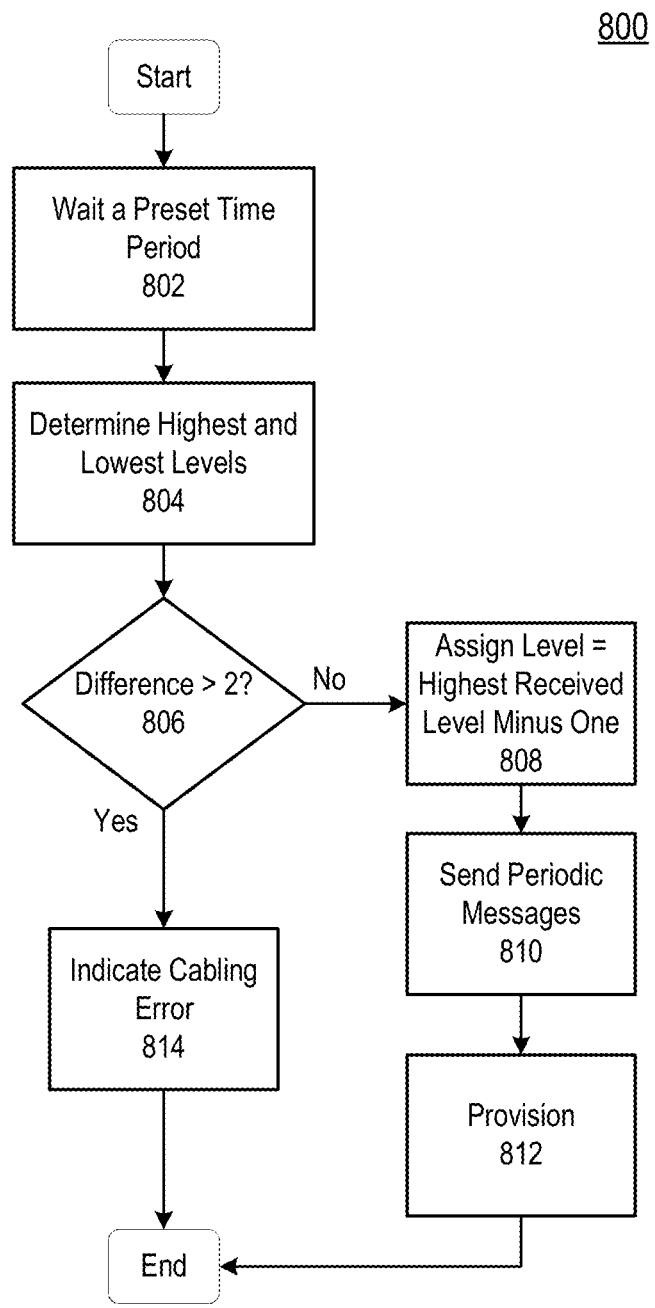
FIG. 8 depicts another example flowchart for determining a level of a device within a network topology and provisioning the device.

Turning now to FIGS. 6-8, which depict example flow charts for consuming a link layer message and determining a level for a device (e.g., a routing node 304, a server stack 306) within a hierarchical network. The steps of FIGS. 6-8 may be performed by a routing node 304 or a server stack 306 in the hierarchical network 300. In some examples, the device may be preconfigured to perform the steps of FIGS. 6-8. In other examples, after boot up, the device may receive instructions to perform the steps of FIGS. 6-8. In some examples, such instructional messages may be received from routing nodes 304 or another device via link layer messages. In some examples, the steps of FIGS. 6-8 may be embodied in computer-readable instructions that are stored by each device's memory. The computer-readable instructions, when executed by one or more processors of the device, may cause the device to perform one or more of the steps of FIGS. 6-8. While the steps of FIGS. 6-8 may be described with particular routing nodes, any of the routing nodes 304 and server stacks 306 of FIG. 3 may perform the steps of FIGS. 6-8.

Prior to performing the steps of FIGS. 6-8, each of the routing nodes 304*a-b* in level x (e.g., the top-most level) of the hierarchical network 300 may receive external input identifying its level within the hierarchical network 300. The external input may be received from a human operator or a remote controlling device. The level in this instance may be considered an authoritative level as the routing nodes 304*a-b* were assigned this level rather than themselves calculating the level. The routing nodes 304*a-b* may receive instructions to periodically send, on each of its ports/links, messages that identify its level (e.g., level x). For example, the message may have subtype bits 10000011 to indicate an "AUTH LEVEL" type. The routing nodes 304*a-b* may then send those messages, and via the nature of the physical wiring in the network, those messages may be received by the routing nodes 304*c-f*, which are one level down in the hierarchy.

At step 602, a routing node 304 in the next level may receive a message from another routing node 304 in the hierarchical network 300. As an example, the routing node 304*c*, by virtue of its link connection with the routing node 304*a*, may receive a message from the routing node 304*a*. The routing node 304*c* may identify the first four significant bits of the Subtype included in the message and determine that the message refers to the autonomous-provisioning protocol.

At step 604, the routing node 304*c* may determine which routing TLV types are included within the message. Prior to receiving the message, the routing node 304 may have received and stored table 500 of FIG. 5. Using the table 500, the routing node 304*c* may examine the subtype bits in each of the TLV 127 containers of the message and use the table 500 to identify which routing TLV types are included in the message.

At step 606, the routing node 304*c* may determine whether the message includes a routing TLV type of "VERSION." If not, the routing node 304*c* may proceed to step 612. Otherwise, if the message includes a version routing TLV type, the routing node 304*c*, at step 608, may extract the version identifier from the Data field and determine whether the version is up-to-date based on the version identifier. The routing node 304*c* may be configured to track (e.g., store) a latest version identifier the routing node 304*c* has received in a message. The routing node 304*c* may also be configured to compare the stored latest version identifier with the version identifier received in the message. If the stored latest version identifier is a higher version than the version identifier received in the message, the message may be considered out-of-date (e.g., stale) and the message may be discarded at step 610. Otherwise, if the version identifier received in the message is equal to or higher than the stored latest version identifier, then the message may be considered up-to-date and the routing node 304*c* may proceed to step 612.

At step 612, the routing node 304*c* may determine whether the message includes a level routing TLV type. For example, the message may include a routing TLV type of "LEVEL" or a routing type of "AUTH LEVEL." If the message does not include a level routing TLV type, then the routing node 304c may proceed to step 622. Otherwise, if the message includes a level routing TLV type, then the routing node 304c may determine, at step 614, whether the routing node 304c has already determined its level and/or otherwise has knowledge of its level within the hierarchical network 300. If not, the routing node 304c may, at step 616, determine its level within the hierarchical network 300 by performing the steps of FIG. 7 or FIG. 8, which are described below. After the routing node 304c has performed one or more (e.g., each) of the steps of FIG. 7 or FIG. 8, the routing node 304c may proceed to step 622.

Otherwise, if the routing node 304c has already been assigned or has already determined its level with the hierarchical network 300, the routing node 304c may, at step 618, determine whether there is a cabling error. For example, the routing node 304c may compare its own level with the level identified in the message to determine whether the level identified in the message is in the same level or an immediately adjacent level of the level of the routing node 304c. If so, the routing node 304c may determine that a cabling error has not occurred and may proceed to step 622. Otherwise, if the level identified in the message is not in the same level or an immediately adjacent level of the level of the routing node 304c, then the routing node 304c may determine that a cabling error has occurred since a message should not have been received from a device having the level identified in the message due to the topology of the hierarchical network 300. As an example, if the level of the routing node 304c is level 5 and the level identified in the message is one of level 4, level 5, or level 6, then the routing node 304c may determine that a cabling error has not occurred. However, in another example, if the level of the routing node 304c is level 5 and the level identified in the message is not one of level 4, level 5, or level 6 (e.g., level 7, level 3, etc.), then the routing node 304c may determine that a cabling error has occurred.

The cabling error determination may be performed by determining whether the absolute value of the difference between the level of the routing node 304 and the level identified in the message received is either 0 or 1. If so, then no cabling error has occurred. Otherwise, if the absolute value of the difference between the level of routing node 304 and the level identified in the message received is not less than 2 (e.g., greater than or equal to 2), then a cabling error has occurred.

If, at step 618, the routing node 304c has determined that a cabling error has occurred, then the routing node 304c may, at step 620, output and/or otherwise indicate that a cabling error has occurred. For example, the routing node 304c may output a visual and/or audible alert. For example, the routing node 304c may send a link layer message announcing the error, which may eventually be received by an administrative device.

At step 622, the routing node 304c may determine whether the message includes a routing TLV type of "REQ." A message may include a routing TLV type of "REQ" if the device sending the message wishes to obtain an indication of the level of the device receiving the message, which may be initiated by an administrator when attempting to locate and fix cabling errors. If the routing node 304c determines that the message includes a routing TLV type of "REQ," the routing node 304c may, at step 624, send a message with its level in the network 300 to the device that sent the message (e.g., its neighboring node), which may be performed by sending the message on the same port/link on which it received the message. If the routing node 304c has not yet determined and/or otherwise does not know its level with the hierarchical network 300, the routing node 304c may send a message with a routing TLV type of "UNK" to indicate that the routing node 304c does not know its level. After sending the message, the routing node 304c may proceed to step 626. Otherwise, if the routing node 304c determines that the message does not include a routing TLV type of "REQ," then the routing node 304c may proceed to step 626.

At step 626, the routing node 304c may determine whether the message includes a routing TLV type of "RST." If so, the routing node 304c may, at step 628, resets its level to unknown and discard its provisioning configuration, if any. The routing node 304c may then proceed to step 630. Otherwise, if the message does not include a routing TLV type of "RST," the routing node 304c may proceed to step 630.

At step 630, the routing node 304c may determine whether the message includes a routing TLV type of "REBUILD." If so, the routing node 304c may, at step 632, reset its level to unknown, discard its provisioning configuration (if any), and send a message, on each of its ports/links to other devices, a message including a routing TLV type of "REBUILD" to cause those other devices to also reset their levels. Then the process may end. Otherwise, if the message does not include a routing TLV type of "REBUILD," the process may end.

FIG. 7 depicts an example flowchart for determining a level of a device within a network topology and provisioning the device. Steps 702-720 of FIG. 7 may be referred to as identity-determination rules. These identity-determination rules may account for the fact that the messages are consumed (and not forwarded). Based on the identity-determination rules and the indications of one or more levels of the devices sending the messages, the device that received the messages may determine its own level within the hierarchical network topology.

Prior to performing the steps of FIG. 7, a routing node 304 (e.g., the routing node 304c) may have performed one or more of steps 602-608 and 612-614 of FIG. 6. For example, the routing node 304c may have received a message including a routing TLV type of "LEVEL" or a routing type of "AUTH LEVEL." In one example, the message may have been sent by the routing node 304a.

At step 702, after the routing node 304c receives a message that includes a level routing TLV type and has determined that it does not know its level, the routing node 304c may wait a configurable preset minimum time period prior to the routing node 304c determining its own level. The configurable preset minimum time period may be 0.5 seconds, 1 second, 5 second, 1 minute, 5 minutes, or any other time period. The preset time period may be preconfigured into the routing node 304c or an indication of the preset time period may be included in a link level message described herein.

By waiting the present minimum time period, the routing node 304c may account for delay in various network paths of the hierarchical network 300 to ensure that the routing node 304c has received all similar messages from other routing nodes 304 (or possible server stacks 306) in the hierarchical network 300. As routing nodes 304 and server stacks 306 determine their own level within the hierarchical network 300 and, they may begin periodically sending, on each of their ports/links, messages that include an indication of their determined level. As a result, routing nodes 304 may receive messages from multiple routing nodes 304 and/or multiple server stacks 306. During the time period, the routing node 304c may monitor its ports and collect any additional messages received from other routing nodes 304. After the preset minimum time period has elapsed, the routing node 304c may extract, from the message that caused the time period to begin (e.g., the message received from the routing node 304a) and each message received during the time period (e.g., a message received from the routing node 304d, a message received from the routing node 304h, etc.), the indication of the level of the routing node 304 or server stack 306 that sent the message.

Unless there is a cabling error, the routing node 304c should only receive the messages from routing nodes 304 within its same level or from its immediately adjacent levels (e.g., one level immediately above the routing node or one level immediately below the routing node).

At step 704, the routing node 304c may determine a total number of different levels (e.g., unique levels) indicated in the received messages. In a first example, the routing node 304c may receive messages only from routing nodes 304a-b. In such an example, the routing node 304c may determine that the total number of different levels equals one since both of the routing nodes 304a-b are in the same level and, thus, both of the messages would identify level x. In a second example, the routing node 304c may receive messages only from the routing nodes 304a and 304d. In such an example, the routing node 304c may determine that the total number of different level equals two since the routing node 304a is in level x and the routing node 304d is in level x−1. As yet another example, the routing nodes 304c may receive messages from the routing nodes 304a-b, d-f, and g-n. In a third example, the routing node 304c may determine that the total number of different levels equals three since the routing nodes 304a-b are in level x, the routing nodes 304d-f are in level x−1, and the routing nodes g-n are in level x−2.

In some examples, the identity-determination rules may assume a routing node 304 or server stack 306 may always receive at least one message from a device (e.g., routing node 304) within a higher level of the hierarchical network 300. For instance, in each of the above-described three examples, the routing node 304c may always receive at least one message from a device (e.g., routing node 304a or routing node 304b) within a higher level of the hierarchical network 300.

At step 706, the routing node 304c may determine whether the total number of different levels indicated in the received messages is equal to one (e.g., the first example). If so, the routing node 304c may, at step 708, assign its level as being equal to the highest received level minus one. Following the above-described first example, the routing node 304c may determine that the highest received level is level x and, as a result, determine that its own level is level x−1. The routing node 304c may then proceed to step 720, which will be described below.

If the total number of different levels indicated in the received messages is not equal to one, the routing node 304c may, at step 710, determine whether the total of different levels is equal to two (e.g., the second example). If so, the routing node 304c may, at step 712, determine whether the highest received level differs from the lowest received level by less than or equal to two. For example, the routing node 304c may subtract the lowest received level from the highest received level and determine whether that difference is less than or equal to two. In an additional or alternative example, the routing node 304c may determine whether the absolute value of the difference of the two received levels is less than or equal to two.

If the difference in the received values is less than or equal to two, the routing node 304c may, at step 708, assign its level as being equal to the highest received level minus one. Following the above-described second example, the routing node 304c may determine that the highest received level is level x and, as a result, determine that its own level is level x−1. The routing node 304c may then proceed to step 720, which will be described below.

If the routing node 304c determines, at step 712, that the difference in received levels is greater than two, the routing node 304c may, at step 714, indicate that a cabling error has occurred since this may be representative of receiving a message that indicates a level that is more than one level above or below the routing node 304c (e.g., the routing node sending the message is not within the same or an adjacent level as the receiving routing node 304c). The routing node 304c may indicate that a cabling error has occurred in the same manner as discussed above in step 620.

If the total number of different levels indicated in the received messages is not equal to one or two, the routing node 304c may, at step 716, determine whether the total of different levels is equal to three (e.g., the third example). If so, the routing node 304c may, at step 718, determine whether the two highest received different levels differ one and whether the two lowest received different levels differ by one. As an example, if the three different levels received are level 6, level 5, and level 4, then the difference between the two highest levels (e.g., level 6 minus level 5) is one and the difference between the lowest levels (e.g., level 5 minus level 4) is one. Since the two highest received levels differ by one and the two lowest received levels differ by one, the routing node 304c may, at step 708, assign its level as being equal to the highest received level minus one. Following the above example, the routing node 304c may assign its level to be level 5 and the routing node 304c may proceed to step 720, which is described below.

If either (a) the two highest received different levels do not differ by one or (b) the two lowest received different levels do not differ by one, the routing node 304c may, at step 714, indicate that a cabling error has occurred since this may be representative of receiving a message that may indicate a level that is more than one level above or below the routing node 304c (e.g., the routing node sending the message is not within the same or an adjacent level as the receiving routing node 304c).

If the total number of different levels indicated in the received messages is greater than three, the routing node 304c may, at step 714, indicate that a cabling error has occurred since this may be representative of receiving a message that identifies a level that is more than one level above or below the routing node 304c (e.g., the routing node sending the message is not within the same or an adjacent level as the receiving routing node 304c).

After the routing node 304c has assigned its level within the hierarchical network 300, the routing node 304c, may, at step 720, begin periodically sending, on each of its ports/links, messages that include an indication of its determined level within the hierarchal network 300. The sending of the periodic messages may cause other routing nodes (e.g., the routing node 304g) to perform the steps of FIGS. 6-8. For example, the routing device 304g may receive the message, wait the configurable preset minimum time period, determine its own level within the hierarchical network 300, and periodically send its own messages announcing its level. As result, the process may be iteratively repeated so that each of the routing nodes 304 and server stacks 306 may eventually indicate their level within the hierarchical network 300.

After the routing node 304c determines its level within the hierarchical network 300 and begins sending periodic messages announcing its level to other routing nodes 304, the routing node 304c may, at step 722, provision itself using its determined level within the hierarchical network 300. The routing node 304c may be preconfigured and/or receive via link layer messages a provisioning protocol, such as, for example, routing in fat trees (RIFT). In RIFT, each routing node 304 and server stack 306 may be provisioned based on its level within the hierarchical network 300. After step 722 (or at least step 720) has begun, the routing node 304c may begin performing step 622 of FIG. 6 to process any remaining routing TLV types included in the originally received message (e.g., the message received from the routing node 304a).

FIG. 8 depicts another example for determining a level of a device within a network topology and provisioning the device. In some examples, the routing node 304c may perform the steps of FIG. 8 instead of performing the steps of FIG. 7. Steps 802-810 of FIG. 8 may be referred to as identity-determination rules. These identity-determination rules may account for the fact that the messages are consumed (and not forwarded). Based on the identity-determination rules and the indications of one or more levels of the devices sending the messages, the device that received the messages may determine its own level within the hierarchical network topology.

Prior to performing the steps of FIG. 8, a routing node 304 (e.g., the routing node 304c) may have performed one or more of steps 602-608 and 612-614 of FIG. 6. For example, the routing node 304c may have received a message that may include a routing TLV type of "LEVEL" or a routing type of "AUTH LEVEL." In one example, the message may have been sent by routing node 304a.

Step 802 may be performed in the same manner as step 702. For example, the routing device 304c may wait a preset minimum amount of time after receiving the message to account for delay in network paths in the hierarchical network 300. During the preset minimum time period, the routing device 304c may collect messages received from other routing nodes 304 (and possibly server stacks 306).

After the preset minimum time period has elapsed, the routing node 304c may, at step 804, determine the highest and the lowest levels indicated in the received messages. As a first example, if the received messages each indicate level 6, the routing node 304c may determine that level 6 is the highest level and level 6 is the lowest level. As a second example, if the received messages indicate level 6 and level 5, the routing node 304c may determine that level 6 is the highest level and level 5 is the lowest level. As a third example, if the received messages indicate level 6, level 5, and level 4, the routing node 304c may determine that level 6 is the highest level and level 4 is the lowest level.

At step 806, the routing node 304c may determine whether the difference between the highest and the lowest is greater than two and, if not, the routing node 304c may, at step 808, assign its level within the hierarchical network 300 to be the highest level minus one. Following the first example, the routing node 304c may determine that level 6 minus level 6 is equal to zero. The routing node 304c may then assign its level to be equal to level 5 (e.g., level 6 minus one). Following the second example, the routing node 304c may determine that level 6 minus level 5 is equal to one. The routing node 304c may then assign its level to be equal to level 5 (e.g., level 6 minus one). Following the third example, the routing node 304c may determine that level 6 minus level 4 is equal to two. The routing node 304c may then assign its level to be equal to level 5 (e.g., level 6 minus one).

After the routing node 304c has assigned its level within the hierarchical network 300, the routing node 304c may, at steps 810 and 812, send periodic messages, on each of its ports/links, announcing its level within the hierarchical network 300 and use its determined level within the hierarchical network 300 to provision itself. Step 810 and 812 may be performed in the same manner as steps 720 and 722, respectively. After step 812 (or at least step 810) has been begun, the routing node 304c may return to step 622 of FIG. 6 to process any remaining routing TLV types included in the originally received message (e.g., the message received from the routing node 304a).

If, at step 806, the routing node 304c determines that the difference between the highest level and the lowest level indicated in the received messages is greater than two, the routing node 304c may, at step 814, indicate that a cabling error has occurred since this may be representative of receiving a message that indicates a level that is more than one level above or below the routing node 304c (e.g., the routing node sending the message is not within the same or an adjacent level as the receiving routing node 304c). As an example, if the highest received level is level 7 and the lowest received level is level 4, the routing server 304c may, at step 806, determine that the difference is three and, as a result, may indicate a cabling error at step 814.

While the steps of FIGS. 6-8 are shown in a particular order, steps may be rearranged and performed in a different order or at the same time. In some cases, some steps may be omitted. As an example, version steps may be omitted. Further, any of the steps may be repeated. For instance, the steps may be repeated for a message received by a server stack 306. While FIGS. 6-8 were discussed with example routing node 304c of FIG. 3, other routing nodes 304 and server stacks 306 may perform the steps of FIGS. 6-8.

By using the system and methodologies described herein, eventually each routing node 304 and server stack 306 within the hierarchical network 300 may determine its level within the hierarchical network and used its level to provision itself.

The descriptions above are merely examples of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
  receiving, by a first computing device and from a plurality of other computing devices, a plurality of messages comprising indications of levels within a wired hierarchical network;
  determining, by the first computing device, a highest level of the wired hierarchical network indicated in the plurality of messages;
  assigning, by the first computing device, a level of the first computing device to be lower than the highest level of the wired hierarchical network indicated in the plurality of messages; and
  sending, by the first computing device, a second message comprising an indication of the level of the first computing device within the wired hierarchical network.

2. The method of claim 1, wherein assigning further comprises:
assigning the level of the first computing device to be one level lower than the highest level of the wired hierarchical network indicated in the plurality of messages.

3. The method of claim 1, further comprising:
provisioning, by the first computing device and based on the level of the first computing device within the wired hierarchical network, the first computing device.

4. The method of claim 1, further comprising:
determining, by the first computing device and based on a difference between the level of the first computing device and a level of a second computing device of the plurality of other computing devices being greater than one, occurrence of a cabling error; and
outputting, by the first computing device, an indication of the cabling error.

5. The method of claim 1, further comprising:
determining, by the first computing device, that the first computing device is connected by a wired cabling link to a second computing device having a level that is more than one level away from the level of the first computing device; and
outputting, by the first computing device and based on determining that the level of the second computing device is more than one level away from the level of the first computing device, an indication of a cabling error.

6. The method of claim 1, wherein the first computing device comprises a router.

7. The method of claim 1, wherein the wired hierarchical network comprises a plurality of levels, wherein each level comprises one or more computing devices and each level is adjacent to at least one other level, and wherein at least one computing device of each level is connected by a wired cabling link to at least one other computing device of an adjacent level.

8. The method of claim 1, wherein the first computing device is connected by a wired cabling link to at least one computing device of a different level of the wired hierarchical network.

9. The method of claim 1, further comprising:
sending, by the first computing device and to a second computing device of the plurality of other computing devices, a message instructing the second computing device to reset a level of the second computing device to indicate an unknown level status.

10. The method of claim 1, further comprising:
routing, by the first computing device and based on the level of the first computing device, an additional message from one of the other computing devices.

11. The method of claim 1, wherein a bottom-most level corresponds to a level of the wired hierarchical network assigned a lowest numerical value, and a top-most level corresponds to a level of the wired hierarchical network assigned a highest numerical value.

12. A computing device comprising:
one or more processors; and
memory storing instructions that, when executed by the one or more processors, cause the computing device to:
receive, from a plurality of other computing devices, a plurality of messages comprising indications of levels within a wired hierarchical network;
determine a highest level of the wired hierarchical network indicated in the plurality of messages;
assign a level of the computing device to be lower than the highest level of the wired hierarchical network indicated in the plurality of messages; and
send a second message comprising an indication of the level of the computing device within the wired hierarchical network.

13. The computing device of claim 12, wherein the instructions, when executed by the one or more processors, cause the computing device to assign the level of the computing device to be one level lower than the highest level of the wired hierarchical network indicated in the plurality of messages.

14. The computing device of claim 12, wherein the instructions, when executed by the one or more processors, cause the computing device to provision, based on the level of the computing device within the wired hierarchical network, the computing device.

15. The computing device of claim 12, wherein the instructions, when executed by the one or more processors, cause the computing device to:
determine, based on a difference between the level of the computing device and a level of a second computing device of the plurality of other computing devices being greater than one, occurrence of a cabling error; and
output an indication of the cabling error.

16. The computing device of claim 12, wherein the instructions, when executed by the one or more processors, cause the computing device to:
determine that the computing device is connected by a wired cabling link to a second computing device having a level that is more than one level away from the level of the computing device; and
output, based on determining that the level of the second computing device is more than one level away from the level of the computing device, an indication of a cabling error.

17. The computing device of claim 12, wherein the instructions, when executed by the one or more processors, cause the computing device to send, to a second computing device of the plurality of other computing devices, a message instructing the second computing device to reset a level of the second computing device to indicate an unknown level status.

18. The computing device of claim 12, wherein the instructions, when executed by the one or more processors, cause the computing device to route, based on the level of the computing device, an additional message from one of the other computing devices.

19. A non-transitory computer-readable medium storing instructions that, when executed by one or more processors, cause the one or more processors to:
receive, by a first computing device and from a plurality of other computing devices, a plurality of messages comprising indications of levels within a wired hierarchical network;
determine, by the first computing device, a highest level of the wired hierarchical network indicated in the plurality of messages;
assign, by the first computing device, a level of the first computing device to be lower than the highest level of the wired hierarchical network indicated in the plurality of messages; and
send, by the first computing device, a second message comprising an indication of the level of the first computing device within the wired hierarchical network.

20. The non-transitory computer-readable medium of claim 19, wherein the instructions, when executed, further cause the one or more processors to:

assign the level of the first computing device to be one level lower than the highest level of the wired hierarchical network indicated in the plurality of messages.

21. The non-transitory computer-readable medium of claim 19, wherein the instructions, when executed, further cause the one or more processors to:

provision, by the first computing device and based on the level of the first computing device within the wired hierarchical network, the first computing device.

22. The non-transitory computer-readable medium of claim 19, wherein the instructions, when executed, further cause the one or more processors to:

determine, by the first computing device and based on a difference between the level of the first computing device and a level of a second computing device of the plurality of other computing devices being greater than one, occurrence of a cabling error; and output, by the first computing device, an indication of the cabling error.

23. The non-transitory computer-readable medium of claim 19, wherein the instructions, when executed, further cause the one or more processors to:

determine, by the first computing device, that the first computing device is connected by a wired cabling link to a second computing device having a level that is more than one level away from the level of the first computing device; and output, by the first computing device and based on determining that the level of the second computing device is more than one level away from the level of the first computing device, an indication of a cabling error.

24. The non-transitory computer-readable medium of claim 19, wherein the instructions, when executed, further cause the one or more processors to:

send, by the first computing device and to a second computing device of the plurality of other computing devices, a message instructing the second computing device to reset a level of the second computing device to indicate an unknown level status.

25. The non-transitory computer-readable medium of claim 19, wherein the instructions, when executed, further cause the one or more processors to:

route, by the first computing device and based on the level of the first computing device, an additional message from one of the other computing devices.

\* \* \* \* \*

UNITED STATES PATENT AND TRADEMARK OFFICE
CERTIFICATE OF CORRECTION

PATENT NO. : 11,582,092 B2
APPLICATION NO. : 17/569734
DATED : February 14, 2023
INVENTOR(S) : Sharma It is certified that error appears in the above-identified patent and that said Letters Patent is hereby corrected as shown below:

In the Specification

Column 2, Line 36:
Delete "hierarchal" and insert --hierarchical-- therefor

Column 8, Detailed Description, Line 56:
Delete "TLV2," and insert --TLV 2,-- therefor Column 8, Detailed Description, Line 57:
Delete "TLV3," and insert --TLV 3,-- therefor Column 9, Detailed Description, Line 7:
Delete "("OUT")" and insert --("OUI")-- therefor Column 14, Detailed Description, Line 60:
Delete "hierarchal" and insert --hierarchical-- therefor Column 14, Detailed Description, Line 63:
Delete "device" and insert --node-- therefor Column 15, Detailed Description, Line 39:
Delete "device" and insert --node-- therefor Column 15, Detailed Description, Line 43:
Delete "device" and insert --node-- therefor Column 16, Detailed Description, Line 28:
Delete "server" and insert --node-- therefor Signed and Sealed this
Thirtieth Day of April, 2024

Katherine Kelly Vidal
*Director of the United States Patent and Trademark Office*